United States Patent [19]

Combs et al.

[11] 4,070,316

[45] Jan. 24, 1978

[54] POLYETHYLENE CONTAINING HOT MELT ADHESIVES

[75] Inventors: Robert L. Combs; Richard L. McConnell; Max F. Meyer, Jr., all of Kingsport, Tenn.

[73] Assignee: Eastman Kodak Company, Rochester, N.Y.

[21] Appl. No.: 730,913

[22] Filed: Oct. 8, 1976

Related U.S. Application Data

[63] Continuation of Ser. No. 585,638, June 10, 1975, abandoned.

[51] Int. Cl.$^2$ ............................................. C08L 91/00
[52] U.S. Cl. ................................................ 260/28.5 A
[58] Field of Search ........................ 260/28.5 A, 27 R

[56] References Cited

U.S. PATENT DOCUMENTS

| | | | |
|---|---|---|---|
| 2,857,350 | 10/1958 | Thompson et al. | 260/28.5 A X |
| 3,644,245 | 2/1972 | Flanagan | 260/27 R X |
| 3,701,760 | 10/1972 | Hagemeyer et al. | 260/82 |
| 3,821,143 | 6/1974 | Cluff et al. | 260/28.5 A X |
| 3,856,889 | 12/1974 | McConnell | 260/897 B |

*Primary Examiner*—Lewis T. Jacobs
*Attorney, Agent, or Firm*—Clyde L. Tootle; Daniel B. Reece, III

[57] ABSTRACT

The hot melt adhesives of the present invention comprise a blend of at least one polyethylene, a tackifying resin, and a Fischer-Tropsch hydrocarbon wax. This hot melt adhesive has a novel combination of properties which meet the requirements necessary for use in rapid bonding or closing applications.

8 Claims, No Drawings

POLYETHYLENE CONTAINING HOT MELT ADHESIVES

This is a continuation of application Ser. No. 585,638 filed June 10, 1975, now abandoned.

This invention relates to polyethylene containing hot melt adhesives. One aspect of this invention concerns a polyethylene containing hot melt adhesive having a novel combination of properties. Another aspect of this invention concerns a polyethylene containing hot melt adhesives that has good adhesive properties and can be used in rapid bonding or closing applications.

Hot melt adhesives are widely used in industry for various applications such as in product assembly. For example, one such application is in the packing industry in the fabrication of corrugated paperboard and also for use in cardboard case sealing and carton closing operations. The adhesive is generally applied by a hot melt applicator which consists of a reservoir for the adhesive, heating means for melting the adhesive and maintaining it in a molten state, and means for applying the adhesive for a particular end use.

The rate at which the adhesive can be applied is primarily a function of the melt viscosity of the adhesives, i.e., the lower the visocisty the faster the rate of application. In order to increase production rates it has been in the past necessary to operate at higher temperatures to reduce the melt viscosity of the adhesive. This often degrades the adhesive which is undesirable. The melt viscosity of polyolefin-based hot-melt adhesives is generally higher when compared with ethylene-vinyl acetate copolymer based hot melt adhesives. Therefore, this has been one of the major problems in the use of polyolefin based hot melt adhesives in competing with other types of hot melt adhesives. Attempts have been made to correct this problem by lowering the melt viscosity of the polyolefin based hot melt adhesive. However, lowering the molecular weight of a polyolefin, such as polyethylene, lowers the melt viscosity, but it also substantially reduces the bond strength of an adhesive made from such polyethylene.

Also, polyethylene-based hot melt adhesives generally have a longer hot tack time (i.e., 2–4 seconds) than similar ethylene-vinyl acetate copolymer based adhesives (i.e., about 1 second). This relatively long hot tack time is a disadvantage for use as fast line speeds. For example, a polyethylene based adhesive used in sealing cartons at a rate of 22 per minute may not be satisfactory at speeds of 44 per minute. Since the packaging industry is continually increasing the speed of operation of their case and carton sealing operations it would be an advance in the state of the art to provide a hot melt polyethylene containing adhesive having the necessary melt viscosity and tack time to be useful in rapid boiling or sealing operations.

It is, therefore, an object of the present invention to provide a novel hot melt adhesive.

Another object of this invention is to provide a hot melt adhesive that has a good balance of properties including both low melt viscosity and short hot tack time.

A further object of the present invention is to provide a polyethylene containing hot melt adhesive which can be used in rapid sealing and bonding operations.

Another and further object of this invention is to provide an adhesive having good adhesion properties which can be applied without the use of a solvent.

In accordance with the present invention we have found that a blend comprising about 50 to 80 percent by weight of at least one polyethylene, a tackifying rein, and a synthetic Fischer-Tropsch hydrocarbon wax provides a hot melt adhesive which can be applied without solvents and has a novel combination of properties including low melt viscosity properties and short hot tack times.

The polyethylenes can be any of the normally solid polyethylenes having a melt viscosity of 500 to 20,000 centipoise at 190° C., preferably 1000 to 6000, and a density greater than 0.90 to about 0.97 g./cc. The polyethylenes are prepared by processes well known in the art. For example, polyethylenes with densities up to about 0.945 are prepared by polymerizing ethylene at pressures greater than 500 atmospheres in the presence of peroxide catalysts. Higher density polyethylenes are prepared, for example, in lower pressure processes with the use of Ziegler and Phillips type catalyts. Blends of polyethylenes prepared by the same or different processes can be used.

The polyethylenes can also be modified polyethylenes having saponification numbers of about 3 to 60 prepared by reaction polyethylene with an unsaturated polycarboxylic acid, anhydride or ester thereof by processes also well known in the art, as for example, U.S. Pat. No. 3,856,889. The polyethylene reacted with this unsaturated component can be low molecular weight or degraded polyethylene. The modified polyethylene alone can be used as the polyethylene component or blends of such modified polyethylene with unmodified polyethylene or blends of modified polyethylene and blends of more than one unomodified polyethylene can also be used.

The tackifying resins useful in the adhesive compositions of this invention can be a hydrocarbon reins such as DAC-B hyrocarbon resin prepared according to the process disclosed in U.S. Pat. No. 3,701,760 as well as other hydrocarbon resins, synthetic polyterpenes, rosin esters and the like. One such suitable hydrocarbon tackifying resin is a hydrocarbon resin having a softening point of 130° C. and available commercially as Eastman Rosin H-130 from Eastman Chemical Products, Inc. Other hydrocarbon tackifying resin can be prepared by the polymerization of monomers consisting primarily of olefins and diolefins and include, for example, the residual by-product monomers resulting from the manufacture of isoprene. These hydrocarbon tackifying resins typically exhibit a Ring and Ball softening point of from about 80° to 125° C.; an acid number of from about 0 to 2; a saponification value of less than about 1; and an iodine value of from about 75–100. Examples of such commercially available resins of this type are "Wingtack" 95 as sold by the Goodyear Tire and Rubber Co. and the Sta-Tac and Betaprene H resins sold by the Reichhold Chemical Corp.

Also suitable resins are the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20% β-pinene and/or limones or dipentenes (racemic limocp. at 177° C. and 0.6 grams of tetrakis[methylene-3-(3′,5′-di-t-butyl-4-hydroxyphenyl)propionate]methane are blended and tested as an adhesive for bonding corrugated board using the procedures described in Example 1. The blend has a melt viscosity at 177° C. of 1150 cp., a Tm of 101° C. and a Tc of 86° C. The bond separation force and percent fiber tear measurements are given in Table 1. The addition of the Fischer Tropsch wax provides a significant increase in the Tc of the blend and concurrently reduces the melt viscosity from 2040 to 1150 cp. at 177° C. and causes a significant increase in bond compression force especially at the short compression times as shown by a Hot tack time of 1.2 sec. Furthermore, the addition of the Fischer Tropsch wax causes a significant increase in the amount of fiber tear obtained in the bonds at compression time of 3.0 sec. or less.

Similarly good results are obtained when 0.35% dilauryl thiodipropionate and 0.1% tetrakis[methylene-3-(3′,5′-di-t-butyl-4-hydroxyphenyl)propionate]methane are used as the stabilization system.

EXAMPLE 3

Low-molecular weight malated polyethylene (210 g.) having a saponification number of 5, a melt viscosity of 3350 cp. at 190° C., Tm of 101° C., and a density of 0.908 g./cc, 89.4 grams of Eastman Resin H-130 hydrocarbon resin tackifier having a density of 1.028 g./cc. at 70° F., melt viscosity of 2150 cp. at 177° C. and ring and ball softening point at 129° C., and 0.6 gram of tetrakis[methylene-3-(3′,5′-di-t-butyl-4-hydroxyphenyl)propionate]methane are blended according to the procedure described in Example 1. This adhesive provides a hot tack time of 1.75 sec. and 100% fiber tear after a compression time of 4 sec.

EXAMPLE 4

Low-molecular weight maleated polyethylene (186.7 g.) having a saponification number of 5, a melt viscosity of 3350 cp. at 190° C., Tm of 101° C. and a density of 0.908 g./cc., 78.65 grams of Eastman Resin H-130 hydrocarbon resin tackifier having a density of 1.028 g./cc. at 70° F., melt visocity of 2150 cp. at 177° C. and ring and ball softening point of 129° C., 33.3 grams of Paraflint RG Fischer Tropsch wax having a melting point of 94°-99° C., 1.05 grams of the lauryl stearyl ester of thiodipropionic acid, and 0.30 grams of tetrakis[methylene-3-(3′,5′-di-t-butyl-4-hydroxyphenyl)propionate]methane are blended according to the proceudre of Example 1. The addition of the Paraflint Fischer Tropsch wax to this composition reduced the melt viscosity from 1860 to 1050 cp. at 177° C. and raised to the Tm from 95° C. to 99° C. and the Tc from 76° C. to 85° C. The effect of the addition of the Fischer Tropsch wax and the maleated polyethylene on bond separation force is reflected in the very short hot tack time of 0.85 sec. obtained with this material. The percent fiber tear obtained in significantly higher than that obtained with the compositions described in Examples 1 or 3, even at a compression time of 0.75 sec.

EXAMPLE 5

Low-molecular weight polyethylene (150 grams) having a melt viscosity of 3075 cp. at 190° C., density of 0.906 g./cc. and Tm of 99° C., 30.0 grams of a low-molecular weight maleated polyethylene having a saponification number of 5, a melt viscosity of 3350 cp. at 190° C., Tm of 101° C., and a density of 0.908 g./cc., 30.0 grams of Paraflint RG Fischer Tropsch was having a melting point of 94°-99° C and a melt viscosity of 4.2 cp. at 177° C., 88.65 grams of Eastman Resin H-130 hydrocarbon resin tackifier having a density of 1.028 g./cc. at 70° F., melt viscosity of 2150 at 177° C. and ring and ball softening point of 129° C., 1.05 grams of lauryl stearyl ester of thiodipropionic acid, and 0.30 grams of tetrakis[methylene-3-(3′,5′-di-t-butyl-4-hydroxyphenyl)propionate]methane are blended according to the procedure of Example 1. This composition has a melt viscosity of 1170 cp. at 177° C., a Tm of 99° C. and a Tc of 84° C. Although the concentration of maleated polyethylene is substantially reduced in this example compared to that of Example 4, the bond separation force and percent fiber tear obtained at short compression times is significantly higher than that obtained in a comparable composition (Example 2) which does not contain any maleated polyethylene.

The following Table 1, referred to hereinbefore, shows the bonding conditions and properties of the adhesives prepared according to Examples 1 to 5.

Table 1

Hot Tack Time for RMA on Corrugated Board
(Melt Temperature 177° C., 0.75 Sec. Open Time, Tri-State Unbalanced 33/44 Corrugated Board, C Flute, S/W)

| Adhesive | | Example 1 | | Example 2 | | Example 3 | | Example 4 | | Example 5 | |
|---|---|---|---|---|---|---|---|---|---|---|---|
| Composition | | 1 | | 2 | | 3 | | 4 | | 5 | |
| Bonding Conditions | Open Time, Sec. | 0.75 | | 0.75 | | 0.75 | | 0.75 | | 0.75 | |
| | Down Pressure, psig. | 16.5 | | 16.5 | | 16.5 | | 16.5 | | 16.5 | |
| | Up Pressure, psig. | 40 | | 40 | | 40 | | 40 | | 40 | |
| | Bead Size, Mils | 70 | | 70 | | 70 | | 70 | | 70 | |
| Compression Time | | BS, Lb.[a] | % FT.[b] | BS, Lb. | % FT. | BS, Lb. | % FT. | BS, Lb. | % FT. | BS, Lb. | % FT. |
| | 0.75 Sec. | 1 | 0 | 17 | 0 | 3 | 0 | 25 | 10 | 19 | 0 |
| | 1.0 Sec. | 6 | 0 | 28 | 0 | 8 | 0 | 36 | 20 | 35 | 10 |
| | 1.5 Sec. | 20 | 0 | 40 | 40 | 23 | 0 | 44 | 60 | 48 | 70 |
| | 2.0 Sec. | 32 | 10 | 46 | 70 | 36 | 0 | 50 | 100 | 53 | 100 |
| | 3.0 Sec. | 46 | 40 | 51 | 100 | 50 | 30 | 54 | 100 | | |
| | 4.0 Sec. | 52 | 60 | | | 55 | 100 | | | | |
| Melt Viscosity, cp., at 149° c. | | 4530 | | 2500 | | 4650 | | 2430 | | 2550 | |
| | 177° C. | 2040 | | 1150 | | 1860 | | 1050 | | 1170 | |
| DSC[c] - Tm, ° C. | | 94 | | 101 | | 95 | | 99 | | 99 | |
| | ° C. | 72 | | 86 | | 76 | | 85 | | 84 | |

[a]BS = Bond Strength
[b]FT = Fiber Tearing
[c]20° C./min. Heating Rate, 5° C./min. Cooling Rate The hot melt adhesives comprising a blend of at least one polyethylene, a tackifying agent, and a Fischer-Tropsch hydrocarbon wax provide adhesives having a unique combination of properties which meet the requirements necessary for use in rapid bonding or closing applications. These adhesives have the low viscosity necessary for use in high speed sealing machines and the adhesive has excellent bond strength when applied over a broad temperature range of from about 300° to 375° F. Such adhesives are especially useful in the packaging industry for use in cardboard carton sealing operations.

The invention has been described in detail with particular reference to certain preferred embodiments thereof, but it will be understood that variations and modifications can be effected within the spirit and scope of the invention.

We claim:

1. An adhesive composition capable of being used as a hot melt adhesive containing as adhesive components a blend essentially consisting of
    a. about 50 to 80 percent by weight of at least one polyethylene having a melt viscosity of 500 to 20,000 centipoise at 190° C.,
    b. about 10 to 40 percent by weight of at least one hydrocarbon tackifier resin, and
    c. about 7 to 15 weight percent of a high melting synthetic Fischer-Tropsch hydrocarbon wax.

2. An adhesive composition according to claim 1 wherein said high melting synthetic hydrocarbon wax has a melting point within the range of 85° C. to 120° C. and is a product of the Fischer-Tropsch process.

3. An adhesive composition according to claim 2 wherein said polyethylene has a melt viscosity of from about 1,000 to about 6,000 centipoise at 190° C.

4. An adhesive composition according to claim 3 wherein said hydrocarbon tackifier resin is a member of the group consisting of
    a. polymers of alpha pinene and
    b. light color, high softening point hydrocarbon resinous products obtained by catalytic polymerization of debutanized aromatic concentrate bottoms derived from a thermal cracking process.

5. An adhesive composition capable of being used as a hot melt adhesive containing as adhesive components a blend essentially consisting of
    a. about 62 weight percent of at least one polyethylene having a melt viscosity of 500 to 20,000 centipoise at 190° C.,
    b. about 27 weight percent of at least one hydrocarbon tackifier, and
    c. about 11 weight percent of a high melting synthetic Fischer-Tropsch hydrocarbon wax.

6. An adhesive composition according to claim 5 wherein said high melting synthetic hydrocarbon wax having a melting point within the range of 85° C. to 120° C. which is a product of the Fischer-Tropsch process.

7. An adhesive composition according to claim 6 wherein said polyethylene has a melt viscosity of from about 1,000 to about 6,000 centipoise at 190° C.

8. An adhesive composition according to claim 7 wherein said hydrocarbon tackifier resin is a member of the group consisting of
    a. polymers of alpha pinene and
    b. light color, high softening point hydrocarbon resinous products obtained by catalytic polymerication of debutanized aromatic concentrate bottoms derived from a thermal cracking process.

* * * * *